United States Patent [19]
Kimura et al.

[11] 4,197,490
[45] Apr. 8, 1980

[54] NUMERICAL CONTROL SYSTEM FOR A MACHINE TOOL HAVING A PLURALITY OF SADDLES

[75] Inventors: Toshihiro Kimura, Nagoya; Mitsuhiro Kawabe, Aichi, both of Japan

[73] Assignee: Okuma Machinery Works Ltd., Nagoya, Japan

[21] Appl. No.: 761,130

[22] Filed: Jan. 21, 1977

[30] Foreign Application Priority Data

Jan. 23, 1976 [JP] Japan .................................. 51-6837

[51] Int. Cl.² .............................................. G05B 11/32
[52] U.S. Cl. .................................... 318/562; 318/600
[58] Field of Search ................................ 318/562, 600

[56] References Cited

U.S. PATENT DOCUMENTS

| | | | |
|---|---|---|---|
| 3,465,298 | 9/1969 | Duke et al. | 318/562 X |
| 3,626,385 | 12/1971 | Bouman | 318/562 X |
| 3,641,326 | 2/1972 | Harte | 318/562 X |
| 3,701,888 | 10/1972 | McDaniel | 318/562 UX |
| 3,760,251 | 9/1973 | Posl et al. | 318/562 X |
| 3,777,128 | 12/1973 | Kirkham | 318/562 X |
| 4,050,001 | 9/1977 | Kishi et al. | 318/562 X |

*Primary Examiner*—B. Dobeck
*Attorney, Agent, or Firm*—Norbert P. Holler

[57] ABSTRACT

A numerical control system for a machine tool having a plurality of saddles; comprising saddle discriminating means for discriminating the saddles from each other, in which saddle discriminating means the cutting work program for controlling the machine tool is described by the use of the same word addresses for each of the saddles but by adding codes for discriminating the saddles from each other at the head of the respective words indicating the same word addresses.

11 Claims, 9 Drawing Figures

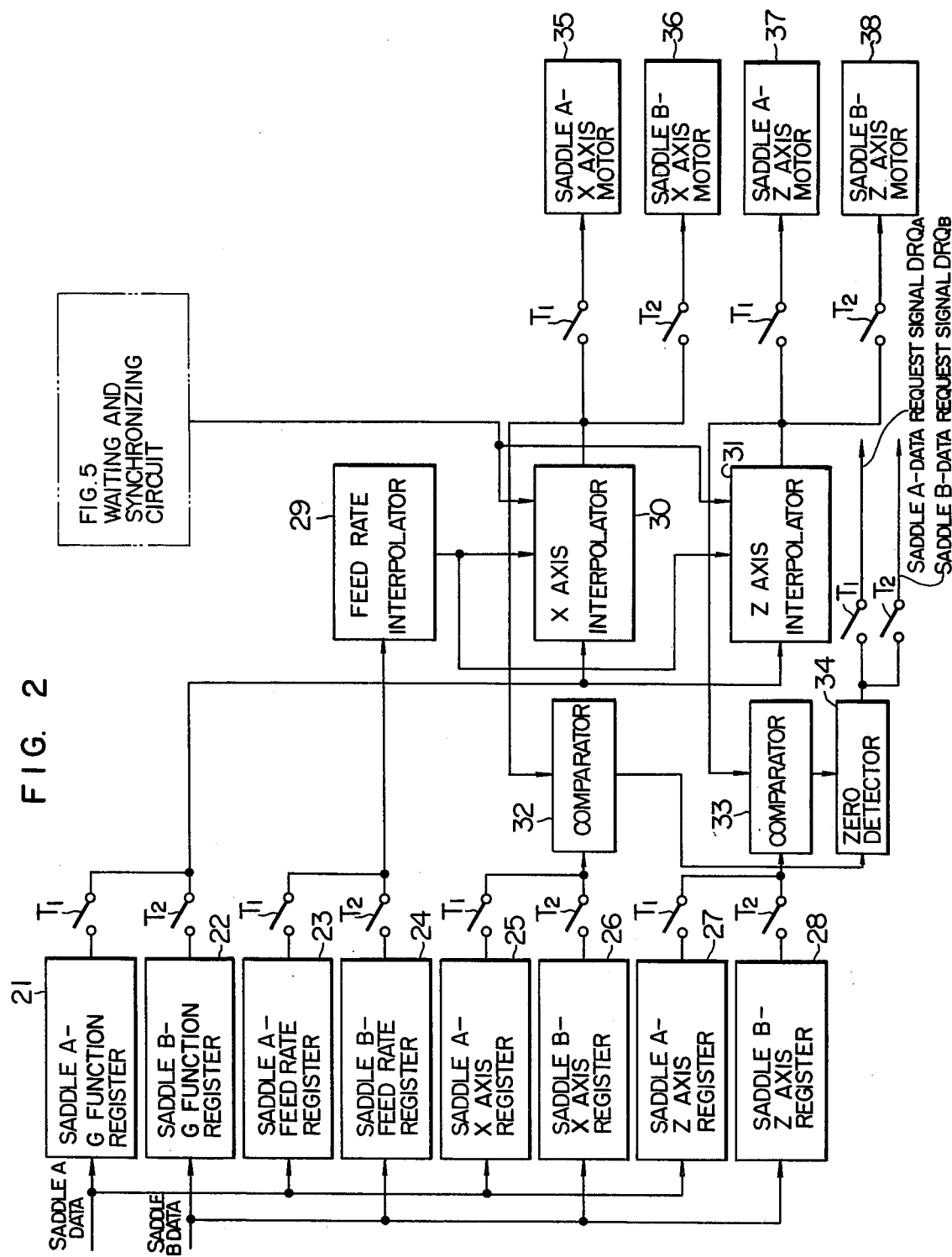

| G80 | SADDLE A | | | | G81 | SADDLE B | | | |
|---|---|---|---|---|---|---|---|---|---|
| N001 | G00 | $XA_1$ | $ZA_1$ | M03 | N001 | G00 | $XB_1$ | $ZB_1$ | M03 |
| N002 | -- | -- | -- | -- | N002 | -- | -- | -- | -- |
| N003 | -- | -- | -- | -- | N003 | -- | -- | -- | -- |
| N004 | -- | -- | -- | -- | N004 | G00 | $XB_4$ | $ZB_4$ | M05 |
| N005 | -- | -- | -- | -- | N005 | | | | |
| N006 | G00 | $XA_6$ | $ZA_6$ | M05 | N006 | | | | |
| N007 | | | | | N007 | | | | |

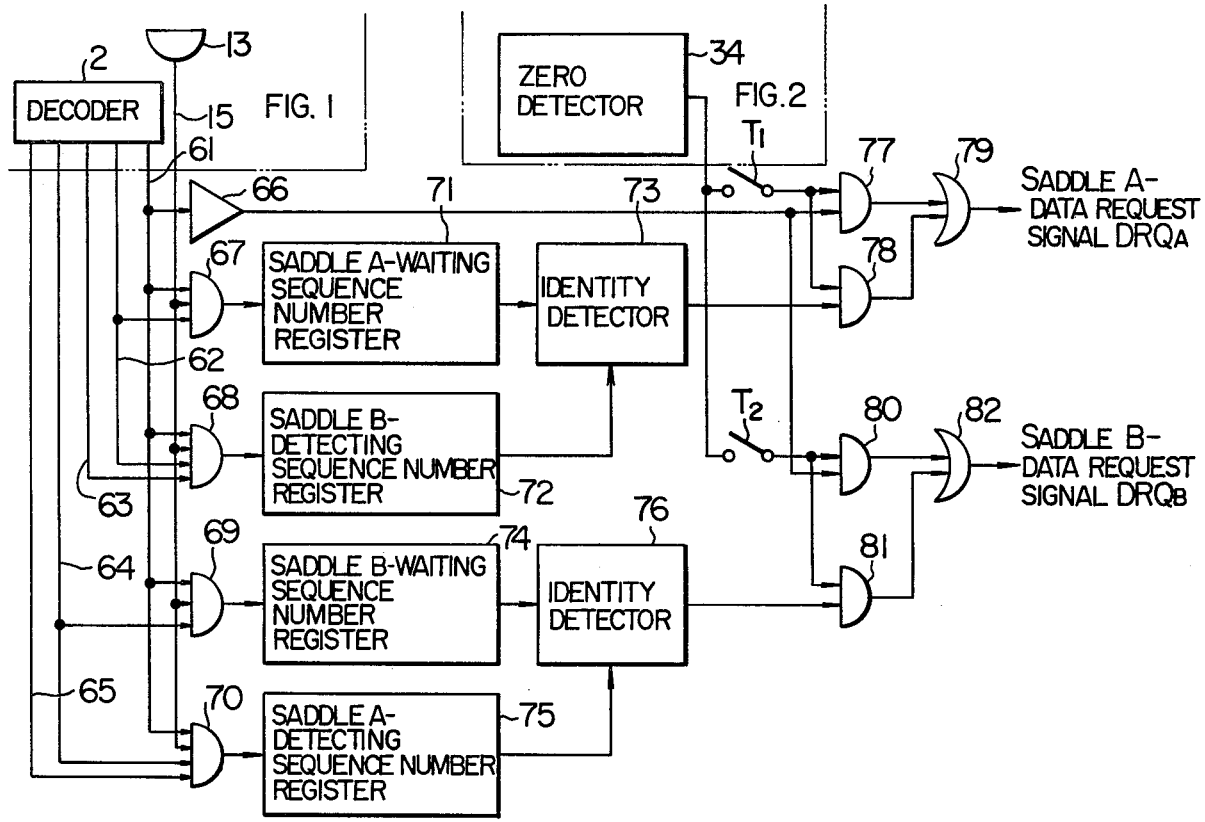
FIG. 7
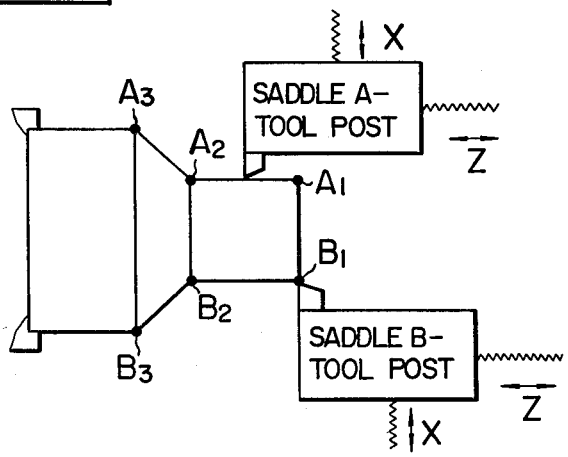
FIG. 8
FIG. 9
| G80 | SADDLE A | | | | G81 | SADDLE B | | | |
|---|---|---|---|---|---|---|---|---|---|
| N001 | G00 | XA$_1$ | ZA$_1$ | | N001 | G00 | XB$_1$ | ZB$_1$ | |
| N002 | G01 | XA$_2$ | ZA$_2$ | | N002 | G83 | | | N003 |
| N003 | G01 | XA$_3$ | ZA$_3$ | | N003 | G01 | XB$_2$ | ZB$_2$ | |
| | | | | | | | | | |
| | | | | | | | | | |
| | | | | | | | | | |
| | | | | | | | | | |

NUMERICAL CONTROL SYSTEM FOR A MACHINE TOOL HAVING A PLURALITY OF SADDLES

FIELD OF THE INVENTION

The present invention relates to a numerical control system for a machine tool, and more particularly to a numerical control system for a machine tool having a plurality of saddles.

Heretofore, in order to control a machine tool having a plurality of saddles, it has been necessary to provide the same number of control systems as that of saddles, thus there were various problems in price and size etc.

An object of the present invention is to provide a numerical control system for a machine tool having a plurality of saddles, in which the machine tool having a plurality of saddles is controlled by a single numerical control system corresponding, in the prior art, to only one saddle.

Another object of the present invention is to provide a numerical control system for a machine tool, comprising saddle discriminating means in which the cutting work program is described by the use of the same word addresses for each of the saddles, and codes for discriminating the saddles are added at the head of the respective words indicating the same word addresses, whereby the saddles can be discriminated from each other.

In accordance with the present invention, it is possible not only to make programming simple but also to control a plurality of saddles by means of a single numerical control system which is for one saddle when used in accordance with the prior art. Further, it is possible to perform simultaneous cutting work of a plurality of saddles since data controlling means which write data for simultaneous cutting portions and, in the case of cutting, read out the respective data are provided. Still further, since waiting and synchronizing means by the use of auxiliary function signals such as S, M and the like and waiting and synchronizing means by the use of sequence numbers concerning mutual saddles are provided, it is possible to perform safely and efficiently the simultaneous cutting operation which is an essential feature of a machine tool having a plurality of saddles.

BRIEF DESCRIPTION OF THE DRAWINGS

FIG. 2 is a control block diagram of an embodiment of a plurality of saddles using time sharing, FIG. 7 is a block diagram of an embodiment of a waiting and synchronizing circuit by the use of sequence numbers according to the present invention, FIG. 8 is a diagram showing the relation between the tool posts of the saddle A and saddle B and the object to be worked, and FIG. 9 is a process sheet diagram for obtaining a shape of the object to be worked shown in FIG. 8.

DETAILED DESCRIPTION OF THE INVENTION

Figure 1:
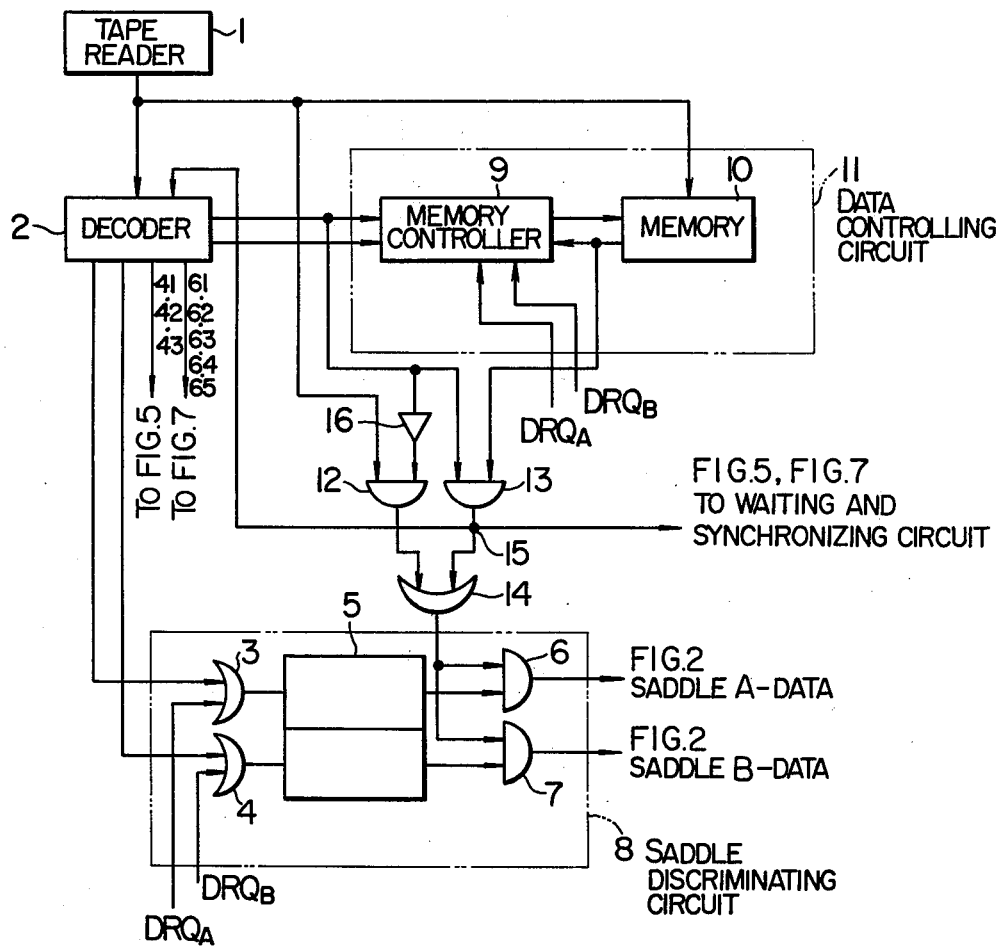
FIG. 1 is a saddle discriminating and data controlling circuit as an embodiment of the present invention.

In the following, the present invention will be described with respect to embodiments illustrated in the accompanying drawings. FIG. 1 shows a saddle discriminating and data controlling circuit as one embodiment of the present invention, in which, numeral 1 designates a tape reader, numeral 2 designates a decoder, numeral 3 designates an OR gate which supplies an output from the decoder 2 or a data requesting signal $DRQ_A$ for a saddle A which will be described later, numeral 4 designates an OR gate which supplies an output from the decoder 2 or a data requesting signal $DRQ_B$ for a saddle B which will be described later. Numeral 5 designates a flip-flop circuit which is set by the output from the OR gate 3 and is reset by the output from the OR gate 4. Numeral 6 designates an AND gate which permits data having passed through an OR gate 14 which will be described later to pass therethrough in the presence of the set output from the flip-flop circuit 5 thereby to supply a data for saddle A or saddle A-data. Similarly, numeral 7 designates an AND gate which permits data having passed through the OR gate 14 to pass therethrough in the presence of the reset output from the flip-flop circuit 5 thereby to supply a data for saddle B or saddle B-data. The OR gates 3 and 4, the flip-flop circuit 5, and AND gates 6 and 7 constitute a discriminating circuit 8, and the saddle A-data and the saddle B-data as the outputs from the saddle discriminating circuit are supplied to the block diagram of FIG. 2, which shows an embodiment of the present invention, for controlling a plurality of saddles by means of time sharing. On the other hand, numeral 9 designates a memory controller which temporarily writes necessary data from the tape reader 1 in a memory 10 which will be described later by a simultaneous cutting instruction from the decoder 2, and reads out, by a write-in completion signal from the decoder 2 or the saddle A-data request signal $DRQ_A$ and the saddle B-data request signal $DRQ_B$, data corresponding to respective saddles written in the memory 10. Numeral 10 designates a memory which has data from the tape reader 1 written in and read out by the memory controller 9. The memory controller 9 and the memory 10 constitute a data controlling circuit 11 in the case of simultaneous cutting. Numeral 12 designates an AND gate which passes data from the tape reader 1 in the absence of the simultaneous cutting instruction from the decoder 2. Numeral 16 designates an inverter which opens the AND gate 12 in the case of non-simultaneous cutting. Numeral 13 designates an AND gate which passes data from the memory 10 by the simultaneous cutting instruction from the decoder 2. Numeral 14 designates an OR gate which receives as its inputs the outputs from the AND gate 12 and the AND gate 13 and supplies its output to the saddle discriminating circuit 8. Further, the output signal line 15 from the AND gate 13 is not only connected as an input to the OR gate 14 but also is connected to the decoder 2 and a waiting and synchronizing circuit shown in FIGS. 5 and 7.

FIG. 2 shows a control block diagram of one embodiment of a plurality of saddles controlled by means of time sharing. The control block itself is well known to those skilled in the art, and the control block receives the data outputted from the saddle discriminating circuit 8 to operate two saddles A and B. Numeral 12 designates a G function register for saddle A or saddle A-G function register and numeral 22 is a G function register for saddle B or saddle B-G function register. Numeral 23 designates a feed rate register for saddle A and numeral 24 designates a feed rate register for saddle B. Numeral 25 designates an X axis register for saddle A and numeral 26 designates an X axis register for saddle B. Numeral 27 designates a Z axis register for saddle A and numeral 28 designates a Z axis register for saddle B. $T_1$ and $T_2$ represent timing signals for time sharing, and these signals have generally a ratio of equally divided time but they may have an arbitrary ratio to some extent. Numeral 29 designates a feed rate interpolator which receives the contents of the saddle A-feed rate register 23 by the timing signal $T_1$ and the contents of the saddle B-feed rate register 24 by the timing signal $T_2$. Numeral 30 designates an X axis interpolator which receives not only the output from the feed rate interpolator 29 but also the contents of the saddle A-G function register 21 by the timing signal $T_1$ and the contents of the saddle B-G function register 22 by the timing signal $T_2$. Numeral 31 designates a Z axis interpolator which functions similarly. Numeral 32 designates a comparator which compares the contents of the saddle A-X axis register 25 or the saddle B-X axis register 26 with the output from the X axis function generator and outputs the difference thereof, and numeral 33 designates a comparator which compares the contents of the saddle A-Z axis register 27 or those of the saddle B-Z axis register 28 with the output from the Z axis interpolator 31 and outputs the difference between them. Numeral 34 designates a zero detector which outputs "1" when both the difference outputs from the comparators 32 and 33 are zero. The output from the zero detector 34 becomes a saddle A-data request signal $DRQ_A$ by the timing signal $T_1$ and becomes a saddle B-data request signal $DRQ_B$ by the timing signal $T_2$. Numeral 35 designates a saddle A-X axis motor which receives as its input the output from the X axis interpolator 30 by the timing signal $T_1$, and numeral 36 designates a saddle B-X axis motor which similarly receives the output therefrom by the timing signal $T_2$. Numeral 37 designates a saddle A-Z axis motor which receives as its input the output from the Z axis interpolator 31 by the timing signal $T_1$, and numeral 38 designates a saddle B-Z axis motor which similarly receives the output therefrom by the timing signal $T_2$.

Figure 3:
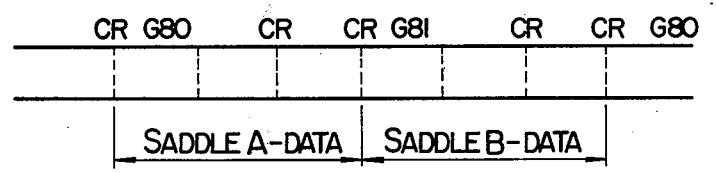
FIG. 3 is a program tape diagram in the case of non-simultaneous cutting for explaining FIG. 1.

Now, the operation of the circuit shown in FIG. 1 which transmits data to the embodiment shown in FIG. 2 will be described. First of all, the case of non-simultaneous cutting will be described with reference to FIG. 3 also. FIG. 3 illustrates a program tape used for non-simultaneous cutting, and this figure is one for explaining the operation of the circuit of FIG. 1. In FIG. 3, the saddles A and B are specified respectively only by codes G80 and G81, and the same word addresses (for example, N, G, X, Z, I, K, F, S, T, M and the like) are used for writing therein the saddle A-data and the saddle B-data. CR is a symbol which indicates the end of each one block on the program tape. When the tape on which the data for saddles A and B are written as described above is read by the tape reader 1, the contents of the tape is read and decoded by the decoder 2. When the code G80 is identified, the decoder 2 sets the flip-flop circuit 5 through the OR gate 3 and the set output of the flip-flop circuit 5 makes the AND gate 6 open. Since it is in the case of non-simultaneous cutting operation, "zero" is supplied to the inverter 16 and its inverted output "1" makes the AND gate 12 open, so that the data, fed from the tape reader 1 through the AND gate 12 and the OR gate 14 to the AND gate 6, are supplied from the AND gate 6 as the saddle A-data. Hereafter, as long as the code G81 is not decoded in the decoder 2, the flip-flop circuit 5 remains in the set condition and, as a result, all the data from the tape reader 1 are assigned to the saddle A. When the code G81 is identified, the decoder 2 resets the flip-flop circuit 5 through the OR gate 4 and its reset output makes the AND gate 7 open. Then, the set output of the flip-flop circuit 5 is cleared, thus, the AND gate 6 is naturally closed. At the same time, the data, fed from the tape reader 1 through the AND gate 12 and the OR gate 14 to the AND gate 7, are outputted from the AND gate 7 as the saddle B-data. Thereafter, similarly, as long as the code G80 is not identified in the decoder 2 the flip-flop circuit 5 remains in the reset condition, therefore, as a result, all the data from the taper reader 1 are assigned to the saddle B. Further, in the case of non-simultaneous cutting operation as described above, the data controlling circuit 11 has nothing to do with such operation.

Figure 4:
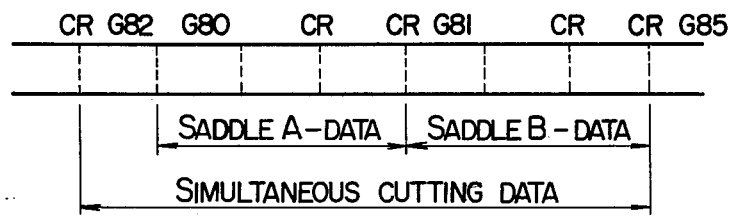
FIG. 4 is a program tape diagram in the case of simultaneous cutting for explaining FIG. 1.

Next, the case of simultaneous cutting will be described with reference to FIG. 4 also. FIG. 4 illustrates a program tape for simultaneous cutting and this figure is also one for explaining the operation of the circuit of FIG. 1. In this case, a code G82 is used as an instruction of simultaneous cutting and a code G85 is used as a completion signal when all the simultaneous cutting data have been written in the memory. Other codes such as G80 and G81, and the word addresses used are the same as those in FIG. 3. When the tape on which the data are stored as stated above is read in the tape reader 1, the contents are read and decoded in the decoder 2. When the code G82 is identified, the decoder 2 gives instructions to the memory controller 9. The memory controller 9 writes in the memory 10 all the data which are necessary for simultaneous cutting as shown in FIG. 4. When this writing has been completed, the decoder 2 decodes the code G85 to give instructions to the memory controller 9. The memory controller 9 reads out first the block in which the code G80 is written. Since, in the case of simultaneous cutting, the AND gate 13 is opened, the code G80 is led through the AND gate 13 and the signal line 15 to the decoder 2. When the code G80 is identified, the decoder 2 sets the flip-flop circuit 5 through the OR gate 3 and the set output of the flip-flop circuit 5 makes the AND gate 6 open, so that the data fed from the memory 10 through the AND gate 13 and the OR gate 14 are outputted from the AND gate 6 as the saddle A-data. While the saddle A is operating by this data, the memory controller 9 reads out the block in which the code G81 is written. Thereafter in the same way as in the case when the code G80 is read out, the data from the memory 10 is outputted from the AND gate 7 as the saddle B-data. When the saddle A has completed one block of operation while the saddle B is operating by these data, the saddle A-data request signal $DRQ_A$ is transmitted to both the memory controller 9 and the OR gate 3 in the saddle discriminating circuit 8. This causes the memory controller 9 to read out the next data for the saddle A. In this case, since the AND gate 6 in the saddle discriminating circuit 8 is again opened, the data inputted from the memory 10 through the AND gate 13 and the OR gate 14 are outputted from the AND gate 6 as the saddle A-data. When the saddle B has completed one block of operation while the saddle A is operating by these data, the saddle B-data request signal $DRQ_B$ is supplied to both the memory controller 9 and the OR gate 4 in the saddle discriminating circuit 8. This causes the memory controller 9 to read out the next data for the saddle B. Thereafter, similarly and repetitively, the data continues to be read out by the data request signals $DRQ_A$ and $DRQ_B$ until the working data for simultaneous cutting are finished to be read, and are assigned to the saddle A or B by the saddle discrimiinating circuit.

Figures 5, 6:
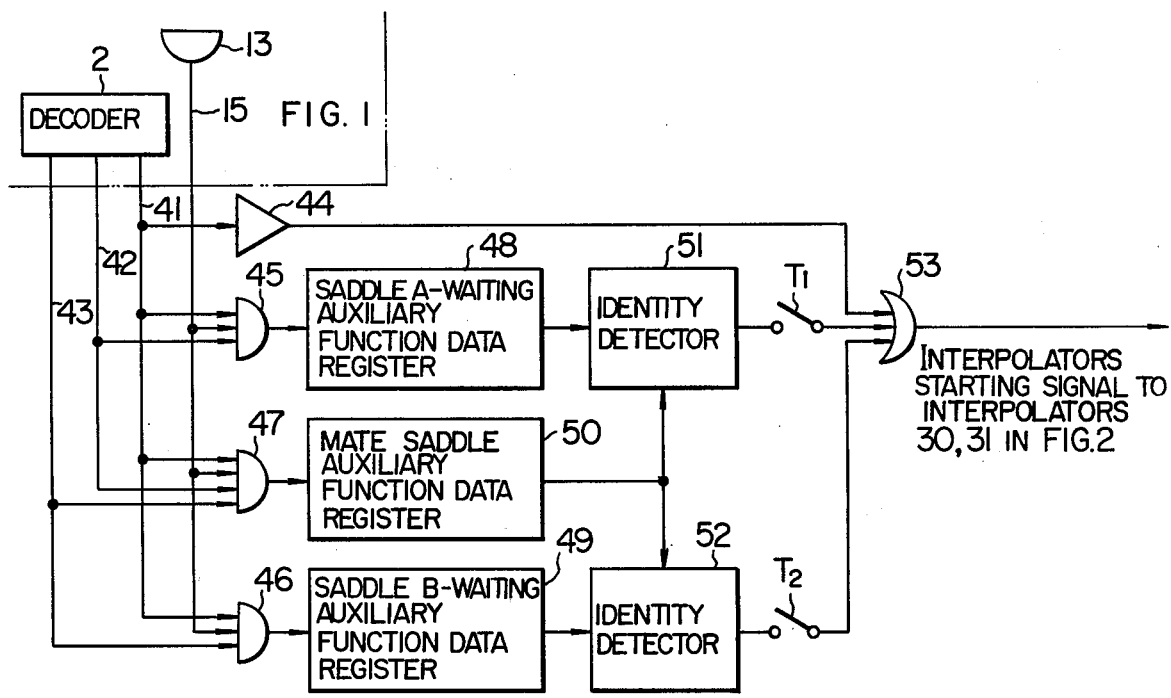
FIG. 5 is a block diagram of an embodiment of a waiting and synchronizing circuit by the use of auxiliary function signals according to the present invention.
FIG. 6 is a process sheet diagram for explaining FIG. 5.

FIG. 5 shows a block diagram of one embodiment of a waiting and synchronization circuit by means of auxiliary function signals according to the present invention. In FIG. 5, numeral 15 designates the output signal line from the AND gate 13 in FIG. 1. In the case of simultaneous cutting, the data read out from the memory is transmitted to the AND gates 45, 46 and 47 in FIG. 5. Numeral 41 designates a signal line which transmits "1" when the instructions of simultaneous cutting for the saddles A and B are identified. Numeral 42 designates a signal line which transmits "1" when it is identified that addresses for waiting are provided for the saddle A. Numeral 43 designates a signal line which transmits "1" when it is identified that addresses for waiting are provided for the saddle B. Numeral 44 designates an inverter which inverts a signal transmitted through the signal line 41. Numeral 45 designates an AND gate which passes the data on the signal line 15 when "1" is transmitted through the signal lines 41 and 42. Numeral 46 designates an AND gate which passes the data on the signal line 15 when "1" is transmitted through the signal lines 41 and 43. Numeral 47 designates an AND gate which passes the data on the signal line 15 when "1" is transmitted through the signal lines 41, 42 and 43. Numeral 48 designates a saddle A-waiting auxiliary function data register which stores data for waiting of saddle A which data passes through the AND gate 45. Numeral 49 designates a saddle B-waiting auxiliary function data register which stores data for waiting of saddle B which data passes through the AND gate 46. Numeral 50 designates a mate saddle auxiliary function data register which stores data for waiting the mate or opposite saddle which corresponds to the saddle A or B which data passes through the AND gate 47. Numeral 51 designates an identify detector which outputs "1" when the data stored in the saddle A-waiting auxiliary function data register 48 and those stored in the opposite saddle auxiliary function data register 50 coincide. Numeral 52 is an identify detector which outputs "1" when the data stored in the saddle B-waiting auxiliary function data register 49 and those stored in the mate saddle auxiliary function data register 50 becomes identical. Numeral 53 designates an OR gate which receives the inverted output from the inverter 44, the output from the identify detector 51 during the time of the time sharing timing signal $T_1$, or the output from the identify detector 52 during the time of the time sharing timing signal $T_2$, and the OR gate generates an interpolators starting signal.

Next, the operation of FIG. 5 will be described. In the case of non-simultaneous cutting, the signal line 41 transmits "0", therefore, the AND gates 45, 46 and 47 are closed, but the "0" on the signal line 41 is inverted by the inverter 44 to be "1" which becomes an interpolators starting signal through the OR gate 53. Thus, in the case of non-simultaneous cutting, the interpolators starting signal is always fed. Next, the case of simultaneous cutting will be described with reference to FIG.

6. FIG. 6 is a process sheet diagram for explaining the embodiment shown in FIG. 5. The meaning of the process sheet shown in FIG. 6 is as follows. The saddle A carries out a rapid feed (G00) to the point ($XA_1$, $ZA_1$) in the state of main shaft positive rotation in the sequence N001, performs a desired operation in the sequences N002 to N005, and thereafter carries out main shaft stop (M05) and also carries out at the same time a rapid feed (G00) to the point ($XA_6$, $ZA_6$) in the sequence N006; and the saddle B carries out rapid feed (G00) to the point ($XB_1$, $ZB_1$) in the state of main shaft positive rotation (M03) in the sequence N001, performs a desired operation in the sequences N002 to N003, and thereafter carries out main shaft stop and rapid feed (G00) to the point ($XB_4$, $ZB_4$) in the sequence N004. This process sheet diagram shows the state that when the saddle B received the instruction of main shaft stop (M05) the saddle A has not yet received the instructions of main shaft stop (M05). Thus, it is so intended that, even when the sequence of the saddle B proceeds to the sequence N004, the main shaft may not be stopped but only the generation of function for the saddle B may be stopped, and when the sequence of the saddle A reaches the sequence N006, the main shaft may be stopped and at the same time the function generation in the sequence N004 for the saddle B may be started. Of course, when the sequence for the saddle A reaches the sequence N006, the main shaft is stopped, but the function generation in the sequence N006 for the saddle A continues. Now, the state when the saddle B reaches the sequence N004 will be described with reference to FIG. 5. When the decoder 2 identifies the word address M for the saddle B main shaft stop (M05), the decoder 2 transmits "1" through the signal line 43. On the other hand, uner the simultaneous cutting condition, since "1" is transmitted through the signal line 41, the AND gate 46 is opened and the data (05) from the signal line 15 is stored in the saddle B-waiting auxiliary function data register 49. Since, at this time, the saddle A has not yet reached the sequence N006, the decoder 2 cannot decode the address M of saddle A main shaft stop (M05) and thus continues to transmit "0" through the signal line 42. Therefore, the AND gate 47 is not opened, the mate saddle auxiliary function data register 50 does not store the data (05), the identify detector 52 supplies "0", which means non-identify, and the interpolators starting signal is not produced. The saddle B does not stop the main shaft but only the function generation in the sequence N004 is stopped. When the saddle A reaches the sequence N006, the decoder 2 is supplied with the address M of the main shaft stop (M05) thereby to transmit "1" through the signal line 42. Since the signal lines 41 and 43 have already transmitted "1", the AND gate 47 is opened and the data (05) of saddle A main shaft stop (M05) are stored in the mate saddle auxiliary function data register 50. Thus, the identity detector 52 which compares the data (05) from the saddle B-waiting auxiliary function data register 49 with the data (05) from the mate saddle auxiliary function data register 50 outputs "1", which means identity, thus the interpolators starting signal is outputted. At this point of time, the main shaft is stopped and the function generation in the saddle B sequence N004 is started. Further, the circuit is so constructed that, after the identity signal has been outputted from the identity detector 52, "0" is again transmitted through the signal lines 42 and 43. Although, in the above, it is described with respect to the case in which a stop for waiting is made for the saddle B, it is also possible in the same way in the case in which the saddle A is made to stop for waiting. In the latter case, the identity detection is carried out with respect to the saddle A-waiting auxiliary function data register 48 and the mate saddle auxiliary function data register 50. Of course, it is possible to make the saddles A and B carry out stopping of waiting alternately in response to cutting condition. Further, although the main shaft stop (M05) is used as an auxiliary function signal in this embodiment, various auxiliary function signals such as main shaft positive rotation (M03), main shaft negative rotation (M04), main shaft speed change (e.g., S 150 or S 300) also can be used.

FIG. 7 is a block diagram of an embodiment of a waiting and synchronizing circuit by the use of sequence numbers according to the present invention. In FIG. 7, numeral 15 designates the output signal line which is connected with the AND gate 13 in FIG. 1 and, in the case of simultaneous cutting, the signal line transmits data read out of the memory to the input portions of AND gates 67, 68, 69 and 70 shown in FIG. 7, respectively. Numeral 61 designates a signal line which transmits "1" when simultaneous cutting instructions of the saddles A and B are identified. Numeral 62 designates a signal line which transmits "1" when stopping instructions for waiting is provided for the saddle A are identified. Numeral 63 designates a signal line which transmits "1" when N which is the address for a saddle B-sequence number is identified. Numeral 64 designates a signal line which transmits "1" when stopping instructions for waiting is provided for the saddle B are identified. Numeral 65 designates a signal line which transmits "1" when N which is the address for a saddle A-sequence number is identified. Numeral 66 designates an inverter which inverts the signal transmitted through the signal line 61. Numeral 67 designates an AND gate which passes the data on the signal line 15 when "1" is transmitted through the signal lines 61 and 62. Numeral 68 designates an AND gate which passes the data on the signal line 15 when "1" is transmitted through the signal lines 61, 62 and 63. Numeral 69 designates an AND gate which passes the data on the signal line 15 when "1" is transmitted through the signal lines 61 and 64. Numeral 70 designates an AND gate which passes the data on the signal line 15 when "1" is transmitted through the signal lines 61, 64 and 65. Numeral 71 designates a saddle A-waiting sequence number register which stores the data passing through the AND gate 67 which data represents the sequence number of the mate saddle for waiting. Numeral 72 designates a saddle B-detecting sequence number register which stores the data passing through the AND gate 68, which data represents the sequence number where saddle B is detected. Numeral 73 designates an identity detector which outputs "1" when the sequence number stored in the saddle A-waiting sequence number register 71 and the sequence number stored in the saddle B-detecting sequence number register 72 coincide. Numeral 74 designates a saddle B-waiting sequence number register which stores the data passing through the AND gate 69 which data represents the sequence number of the mate saddle for waiting. Numeral 75 designates a saddle A-detecting sequence number register which stores the data passing through the AND gate 70 which data represents the sequence number where saddle A is detected. Numeral 76 designates an identity detector which outputs "1" when the sequence number stored in the saddle B-waiting sequence number register 74 and the sequence number stored in the saddle A-detecting sequence number register 75 coincide each other. Numeral 77 designates an AND gate which generates "1" when the output "1" from the zero detector 34 transmitted by the time sharing timing signal $T_1$ and the output "1" from the inverter 66 are inputted. Numeral 78 designates an AND gate which generates "1" when the output "1" from the zero detector 34 transmitted by the time sharing timing signal $T_1$ and the output "1" from the identity detector 73 are inputted. Numeral 79 designates an OR gate which receives the output from the AND gate 77 or the output from the AND gate 78 and outputs a saddle A-data request signal $DRQ_A$. Numeral 80 designates an AND gate which outputs "1" when the output "1" from the zero detector 34 transmitted by the time sharing timing signal $T_2$ and the output "1" from the inverter 66 are inputted. Numeral 81 designates an AND gate 81 which outputs "1" when the output "1" from the zero detector 34 transmitted by the time sharing timing signal $T_2$ and the output "1" from the identity detector 76 are inputted. Numeral 82 designates an OR gate which receives the output from the AND gate 80 or the output from the AND gate 81 and generates the saddle B-data request signal $DRQ_B$.

Next, the operation of FIG. 7 will be described. First, in the case of non-simultaneous cutting, the signal line 61 transmits "0" so that the AND gates 67, 68, 69 and 70, are closed, however, "0" on the signal line 61 is inverted by the inverter 66 and the resultant "1" opens the AND gates 77 and 80. Accordingly, when the zero detector 34 generates "1", this output "1" passes through the AND gate 77 when the time sharing timing signal $T_1$ is present, and further passes through the OR gate 79 and thus the output becomes the saddle A-data request signal $DRQ_A$, while the output "1" of the zero detector 34 passes through the AND gate 80 when the time sharing timing signal $T_2$ is present, and further passes through the OR gate 82 and thus the output becomes the saddle B-data request signal $DRQ_B$. Next, the case of simultaneous cutting will be described with reference to FIGS. 8 and 9. FIG. 8 is a diagram for explaining FIG. 7, showing the relation between the tool posts of the saddles A and B and the object to be worked. In FIG. 8, it is so arranged that soon after the cutting work on the saddle A-tool post is done a cutting work on the saddle B-tool post is carried out. FIG. 9 shows a process sheet diagram for shaping the object to be worked shown in FIG. 8. The meaning of the process sheet shown in FIG. 8 is as follows. The saddle A carries out a rapid feed (G00) to the point ($XA_1, ZA_1$) in the sequence N001, carries out a cutting feed (G01) to the point ($XA_1, ZA_1$) in the sequence N002, and carries out a cutting feed (G01) to the point ($XA_3, ZA_3$) in the sequence N003; while, the saddle B carries out a rapid feed (G00) to the point ($XB_1, ZB_1$) in the sequence N001, makes a waiting (G83) in the sequence N002 until the mate saddle A reaches the sequence N003, and as soon as saddle A reaches the sequence N003 it starts to carry out a cutting feed (G01) to the point ($XB_2, ZB_2$) in the sequence N003. It is due to the cutting condition that the saddle B must not proceed the saddle A that the saddle B waits. Now, the situation in which the saddle B has reached the sequence N002 will be described with reference to FIG. 7. Due to a condition that the saddle is B (G81) and the waiting (G83) is performed, the decoder 2 transmits "1" through the signal line 64. On the other hand, under the simultaneous cutting condition, since "1" is transmitted through the signal line 61, the AND gate 69 is opened and the sequence number for the mate saddle A (003) is store through the signal line 15 into the saddle B-waiting sequence number register 74. At this time, if the saddle A is in the state of the sequence N002, the sequence number (002) should have been stored already in the saddle A-detecting sequence number register 75. This is because, when N which is the saddle A sequence number address is identified, the decoder 2 transmits "1" through the signal line 65 while the sequence number (002) on the signal line 15 passes through the AND gate 70. Thus, because of non-identify, the identity detector 76 generates "0" to close the AND gate 81, therefore, the saddle B-data request signal $DRQ_B$ is not generated. Next, as soon as the sequence of the saddle A changes to the sequence N003, the sequence number (003) is newly stored in the saddle A-detecting sequence number register 75 to cause the identity detector 76 to generate the identity signal "1" which makes the AND gate 81 be opened. The identity signal "1" which is already outputted from the zero detector 34 passes through the AND gate 81 when the time sharing timing signal $T_2$ is present, and further passes through the OR gate 82 and thus the identity signal becomes the saddle B-data request signal $DRQ_B$. Further, if the sequence of the saddle A has been changed to the sequence N003 when the sequence of the saddle B changes to the sequence N002; as soon as "1" is transmitted through the signal line 64, the same sequence number (003) is stored simultaneously in both the saddle B-waiting sequence number register 74 and the saddle A-detecting sequence number register 75, therefore, the identity detector 76 outputs the identity signal "1" and the saddle B-data request signal $DRQ_B$ is outputted, and the saddle B does not stop for waiting. Although, in the above, the case in which the saddle B is made to stop for waiting was described, the case in which the saddle A is made to stop for waiting is also possible in the same way. In the latter case, the identity detection is performed with respect to the saddle A-waiting sequence number register 71 and the saddle B-detecting sequence number register 72. Of course, it is possible to make the saddles A and B stop alternately for waiting in response to cutting condition.

Various modifications in structure and/or function may be made by one skilled in the art to the disclosed embodiments without departing from the scope of the invention as defined by the claims.

What is claimed is:

1. A numerical control system for a machine tool having a plurality of saddles comprising a saddle discriminating means having a cutting work program for each of the saddles, the cutting work program assigning the same word addresses for each of the saddles and adding a different code to the beginning of each of the addresses to discriminate the cutting work program for a given saddle from the work program of any other saddle, data controlling means for writing temporarily respective data for portions to be cut simultaneously in the working programs of the saddles and for reading respective data applying each of the discriminated cutting work programs to a respective one of the plurality of saddles, and each saddle having means for shaping a workpiece on the saddle.

2. A numerical control system for a machine tool having a plurality of saddles as claimed in claim 1, wherein said saddle discriminating means comprises flip-flop circuit and AND gates.

3. A numerical control system for a machine tool having a plurality of saddles as claimed in claim 1, wherein said data controlling means comprises a memory controller which writes temporarily respective data for portions to be cut simultaneously in the working programs of said saddles by simultaneous cutting instructions from a decoder and reads respective data corresponding to said saddles by a write completion signal or a data request signal, and a memory which is controlled by said memory controller.

4. A numerical control septem according to claim 1, comprising a waiting and synchronizing means which causes the saddles to wait to be moved before being synchronized in their cutting operation.

5. A numerical control system for a machine tool having a plurality of saddles as claimed in claim 4, wherein said waiting and synchronizing means is so constituted that synchronization is performed by auxiliary function signals such as S, M and like which are common to said saddles.

6. A numerical control system for a machine tool having a plurality of saddles as claimed in claim 4, wherein said waiting and synchronizing means is so constituted that synchronization is performed by using the sequence numbers with respect to the mating saddles.

7. An apparatus for controlling a cutting program for a numerical control machine having a plurality of work saddles comprising input means for storing and providing instructing output signals for the cutting program to each work saddle;
   discriminating means for receiving the instruction output signal and selectively distributing to each saddle a unique discriminated output signal, the discriminated output signal for each work saddle including the same cutting program for each saddle;
   means on each saddle for shaping a workpiece according to the discriminated output signal;
   cutting control means for controlling the simultaneous or non-simultaneous operation of each shaping means; and
   a waiting and synchronizing circuit means for causing any work saddle and shaping means to complete a desired cutting cycle in accordance with the desired cutting cycle of another work saddle and shaping means.

8. An apparatus according to claim 7 wherein the discriminating means comprises a plurality of OR gates, each work saddle having a respective OR gate, a flip-flop circuit and a like plurality of AND gates, a first OR gate receiving the instruction output signal to set the flip-flop circuit and a second OR gate receiving the instruction output signal to reset the flip-flop circuit, and the AND gates inputs being the output of the flip-flop circuit.

9. An apparatus according to claim 7 comprising a cutting program control means for controlling the simultaneous operation of each shaping means, the cutting program control means receiving the instruction output signal and comprising a memory controller means controlling a memory means, the cutting program control means providing a simultaneous cutting input signal to the discriminating means.

10. An apparatus according to claim 7 including a non-simultaneous control circuit means comprising an AND gate, an OR gate and an inverter, the AND gate and the inverter receiving the instruction output signal, the OR gate receiving the AND gate output signal and providing an output signal to the discriminating circuit.

11. An apparatus according to claim 4 including a simultaneous control circuit means comprising an AND gate providing an output to an OR gate, the AND gate receiving the instruction output signal and the simultaneous cutting input signal, the OR gate receiving the output of the AND gate.

* * * * *

UNITED STATES PATENT AND TRADEMARK OFFICE
CERTIFICATE OF CORRECTION

PATENT NO. : 4,197,490
DATED : April 8, 1980
INVENTOR(S) : Toshihiro Kimura et al.

It is certified that error appears in the above-identified patent and that said Letters Patent are hereby corrected as shown below:

Column 11, line 3, for "claim 4" read --claim 9--.

Signed and Sealed this

Second Day of September 1980

[SEAL]

Attest:

SIDNEY A. DIAMOND

Attesting Officer   Commissioner of Patents and Trademarks